US000001482H

United States Statutory Invention Registration [19]

[11] Reg. Number: H1482

St. Clair et al. [43] Published: Sep. 5, 1995

[54] COATINGS FOR METALS BASED ON FUNCTIONALIZED BLOCK COPOLYMERS

[75] Inventors: David J. St. Clair, Houston; James R. Erickson, Katy; Michael J. Watkins, Houston, all of Tex.

[73] Assignee: Shell Oil Company, Houston, Tex.

[21] Appl. No.: 117,382

[22] Filed: Sep. 7, 1993

Related U.S. Application Data

[63] Continuation of Ser. No. 593,607, Oct. 9, 1990, abandoned, which is a continuation of Ser. No. 129,119, Dec. 4, 1987, abandoned.

[51] Int. Cl.[6] ..... B32B 15/04

[52] U.S. Cl. ..... 428/457; 428/462; 524/203; 524/505; 427/208.4

[58] Field of Search ..... 428/457, 462; 525/292, 525/291; 524/203, 505; 427/208.4; 72/42

[56] References Cited

U.S. PATENT DOCUMENTS

| | | | |
|---|---|---|---|
| 3,231,419 | 1/1966 | Korpman | 427/208.4 |
| 3,625,752 | 12/1971 | Korpman | 427/208.4 |
| 3,792,005 | 2/1974 | Harlan | 524/505 |
| 3,923,673 | 12/1975 | Van Henten et al. | 252/59 |
| 4,028,292 | 6/1977 | Korpman | 524/203 |
| 4,329,401 | 5/1982 | Talsma et al. | 428/462 |
| 4,439,587 | 3/1984 | Martinez et al. | 525/292 |
| 4,578,429 | 3/1986 | Gergen et al. | 525/291 |

FOREIGN PATENT DOCUMENTS

| | | | |
|---|---|---|---|
| 1130947 | 8/1982 | Canada | 428/349 |

OTHER PUBLICATIONS

D. Bauer, Process In Organic Coatings. 14 (1986), "Melamine/Formaldehyde Crosslinkers", pp. 193–218.

Cymel ® 303 Crosslinking Agent, 1985 American Cyanamide Company, pp. 1–24.

Cyanamid(1) "High Solids Amino Crosslinking Agents", 1984, pp. 1–21, American Cyanamid Company.

Cyanamid(2), "Compositional Guide to High Solids Melamine–Formaldehyde Cross–linking Agents", 1984, 2 pages, American Cyanamid Co.

Cymel ® & Beetle ®, "Conventional Butylated Amino Resins", 1981, pp. 1–6, American Cyanamid Company.

R. Strand, "Modern Container Coatings", American Chemical Society, Sep. 2, 1977, pp. 24–37.

Gerhardt et al, Coatings for Drawn Tinplate and Chrome–Coated Steel Food Containers, 1978 American Chemical Society.

*Primary Examiner*—Donald P. Walsh
*Assistant Examiner*—Chrisman D. Carroll

[57] ABSTRACT

A permanent, flexible coating for protecting and lubricating metal that is formed into articles by single step or multiple step bending or stamping deformation is disclosed. The coating comprises a block copolymer which is formed from selective hydrogenation of an $(A-B)_n-A$ or $(A-B)_n$ block copolymer. Monomers containing functional groups, preferably monocarboxylic or polycarboxylic acid compounds or their derivatives, are grafted onto the selectively hydrogenated block copolymer in an amount sufficient to improve adhesion of the polymer to the metal. The functionalized block copolymer can be crosslinked to improve resistance of the coating to organic solvents.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COATINGS FOR METALS BASED ON FUNCTIONALIZED BLOCK COPOLYMERS

This is a continuation of application Ser. No. 07/593,607 filed Oct. 9, 1990, now abandoned which is a continuation of application Ser. No. 07/129,119, filed Dec. 4, 1987, now abandoned.

This invention relates to coatings for metals. More particularly, it relates to a coating which is applied to a metal for decorative or protective purposes. In addition, the coating is flexible enough that it can be applied to metal prior to bending or stamping the metal into a finished article and the coating will continue to provide its decorative or protective function.

BACKGROUND OF THE INVENTION

Coatings are commonly applied to metals to make them cosmetically appealing or to protect them against deterioration during service. The metal can be formed into the shape of the finished article and then the coating can be applied. If the coating can survive the forming operation, it can be applied to the metal before forming, making it unnecessary to apply another coating on the finished article.

It is usually advantageous to apply the coating onto the metal in sheet or coil form before the forming operation. Two major advantages are that it is much easier to apply thin coatings of uniform thickness to flat metal than to an irregularly shaped formed article and that the coating provides lubrication to protect the metal during forming.

The requirements which a coating must meet depend on the particular application for which the article is intended. A major requirement for any coating which is applied prior to the forming operation is that the coating must survive the metal forming operation. Many types of coatings which would otherwise fulfill an adequate decorative or protective function fail if applied before forming because they crack during the forming operation and therefore can no longer fulfill their decorative or protective function. It is common to heat precoated metal in the forming equipment to temperatures as high as 100° C. to soften the coating so it will survive forming.

There are many applications for coated metals. One example in particular is in coatings for metal containers. Metal containers that are formed by single step drawing or multiple step drawing are usually coated for lubrication. Coating of the metal is also desired for protection of the metal prior to and subsequent to formation of the container. An ideal coating would protect the metal from corrosion prior to the formation of the container, lubricate the metal during severe drawing to minimize the strain on the metal, protect the metal after formation of the container, and withstand any further processing of the container such as heating or steam sterilization. Furthermore, the coating on the inside of the container must be compatible with the contents of the container and the coating on the outside of the container should be resistant to scuffing for the life of the container.

U.S. Pat. No. 3,792,005 disclosed that coatings can be made using block copolymers of the A-B-A type where A is a monovinyl aromatic polymer block, usually polystyrene (S), and B is a rubber polymer block, usually hydrogenated polybutadiene (EB) or hydrogenated polyisoprene (EP). These polymers could be especially useful in metal coatings applied prior to forming because they can be formulated to have good flexibility and therefore, will not crack during metal forming. However, coatings based on conventional A-B-A type block copolymers are deficient in that they lack strong adhesion and in applications in which the coating will contact organic liquids such as gasoline, the coatings will merely dissolve off of the metal. U.S. Pat. No. 3,970,771 disclosed a primer composition to promote adhesion of block copolymer based coatings to metals.

S-B-S type block copolymers, wherein the B block is an unsaturated polybutadiene, have been mixed with oils to prepare removable thermoplastic rubber coatings for metal that is subjected to mechanical deformation as disclosed in U.S. Pat. No. 3,923,673. The S-B-S block copolymer coating is quite flexible and withstands deformation of the metal while providing lubrication between the metal and the metal deforming equipment. However, the thermoplastic rubber and oil coatings are not ideally suited for the container industry since the coating is removable and would require the application of a final coating.

Chlorinated natural and synthetic rubbers have been grafted with acrylic acid compounds to form coatings for metals as disclosed by U.S. Pat. No. 4,439,587. High acrylic acid content is disclosed as allowing aqueous dispersions of the coating which can be crosslinked with aminoplast resins.

Metal container coatings have also been formed from a latex of a high nitrile polymer made by emulsion polymerization of acrylonitriles, styrenes, and dienes as disclosed in U.S. Pat. No. 4,329,401. The latex can be applied to the metal by rolling, spraying, dipping and other means.

SUMMARY OF THE INVENTION

According to the present invention, there is provided a process and corresponding product for coating metal that is bent or stamped into the shape of a funished article, including the steps of:

(1) coating at least one surface of the metal with a selectively hydrogenated and functionalized block copolymer having an A-B-A configuration, wherein each A component of the block copolymer is predominately a polymerized vinyl aromatic hydrocarbon, each B component of the block copolymer prior to hydrogenation and grafting is predominately a polymerized conjugated diene, each A component is hydrogenated to an unsaturation that is above 50% of the original unsaturation, each B component is hydrogenated to an unsaturation that is below 10% of the original unsaturation, and monomers containing functional groups are grafted on to the polymer in an amount from about 0.2 to about 5 weight percent to improve adhesion of the copolymer to the metal; and (2) forming the coated metal into the shape of the finished article.

An aspect of this invention is the ability of the selectively hydrogenated and functionalized block copolymer to adhere to the metal to form a permanent, flexible coating.

Another aspect of the invention lies in the use of thermally stable selectively hydrogenated block copolymers which can withstand steam sterilization, as is required, for example, of interior coatings for food containers.

Another aspect of this invention is the ability of the functionalized block copolymer to be crosslinked for resistance to destruction by contact with organic liquids such as gasoline.

The present invention demonstrates that both the adhesion and solvent resistance limitations can be overcome by using functionalized A-B-A type polymers while maintaining the many advantages of coatings based on conventional A-B-A type block copolymers without having to undergo the undesirable step of priming the metal before applying the coating. Specifically, the functionality on the polymer promotes chemical interaction between the metal and the polymer thereby improving adhesion. Also, the functionality gives reactive sites through which the polymer can be cross-linked.

DETAILED DESCRIPTION OF THE INVENTION

Selectively Hydrogenated Block Copolymers

Block copolymers have been produced, see U.S. Pat. No. Re 27,145 which comprise primarily those having a general structure $(A-B)_n-A$ or $(A-B)_n$ wherein the polymer blocks A comprise thermoplastic polymer blocks of vinylarenes such as polystyrene, wherein block B is a polymer block of a selectively hydrogenated conjugated diene and wherein n is 1 or greater. The proportion of the thermoplastic terminal blocks to the center elastomeric polymer block and the relative molecular weights of each of these blocks is balanced to obtain a rubber having an optimum combination of properties such that its behavior resembles that of a vulcanized rubber without requiring the actual step of vulcanization. Moreover, these block copolymers can be designed not only with this important advantage but also so as to be handled in thermoplastic processing equipment and are soluble in a variety of relatively low cost solvents.

The process by which the block copolymers are prepared is not critical to this invention. However, the block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference.

Conjugated dienes which may be utilized to prepare the polymers and copolymers are those having from 4 to 8 carbon atoms and include 1,3-butadiene, 2-methyl-1,3-butadiene(isoprene), 2,3-dimethyl-1,3-butadiene, 1,3-pentadiene, 1,3-hexadiene, and the like. Mixtures of such conjugated dienes may also be used. The preferred conjugated diene is 1,3-butadiene.

Vinyl aromatic hydrocarbons which may be utilized to prepare selectively hydrogenated block copolymers include styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene.

While these block copolymers have a number of outstanding technical advantages, one of their principal limitations lies in their sensitivity to oxidation. This was due to their unsaturated character which can be minimized by hydrogenating the copolymer, especially in the center section comprising the polymeric diene block. Hydrogenation may be effected selectively as disclosed in U.S. Pat. No. Re 27,145 which is incorporated by reference herein. These polymers are hydrogenated block copolymers having a configuration, prior to hydrogenation, of $(A-B)_n-A$ or $(A-B)_n$ wherein each of the A's is an alkenyl-substituted aromatic hydrocarbon polymer block and B is either a butadiene polymer block wherein 30–55 mol percent of the condensed butadiene units in the butadiene polymer block have the 1,2 configuration, or B is an isoprene polymer block having predominately 1,4 configuration.

The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.05 to about 20 percent of their original unsaturation content prior to hydrogenation, and above about 50 percent of the original unsaturation in the alkenyl-substituted aromatic hydrocarbon block.

Functionalized Block Copolymer

The selectively hydrogenated $(A-B)_n-A$ or $(A-B)_n$ block copolymers are deficient in many applications in which adhesion is required due to their hydrocarbon nature. However, the placement onto the block copolymers of functional groups, preferably monocarboxylic or polycarboxylic acid groups, which can provide interactions not possible with hydrocarbon polymers promotes adhesion of the polymers to polar substrates and thereby extends the range of applicability of this material as described in U.S. Pat. No. 4,578,429.

The particular process used to functionalize the selectively hydrogenated block copolymers is not critical to this invention. However, they can be prepared as taught by U.S. Pat. Nos. 4,578,429 which is incorporated by reference herein. That patent describes the grafting of monomers to secondary and tertiary carbon atoms on the hydrogenated diene component of the block copolymers.

Polystyrene-polybutadiene-polystyrene (S-B-S) block copolymers that are selectively hydrogenated to be essentially polystyrene-poly(ethylene/butylene)-polystyrene (S-EB-S) block copolymers are found to be excellent coatings for metal when graft modified to contain from about 0.2 to about 5 weight percent of a monocarboxylic or polycarboxylic acid compound or its derivative as taught by the '429 patent. The polar functionality of the selectively hydrogenated block copolymer improves the adhesive property of the thermally stable coating and also provides reactive sites by which the polymer can be crosslinked with aminoplast resins to improve the resistance of the coatings to organic liquids.

The functionalized block copolymer useful in the present invention is preferably prepared by graft reacting a monocarboxylic or polycarboxylic acid compound, such as maleic acid or a derivative such as maleic anhydride, with a selectively hydrogenated A-B-A block copolymer wherein the A component is predominately a polymerized vinyl aromatic hydrocarbon, and the B component prior to hydrogenation is predominately a polymerized conjugated diene. The A component is preferably polystyrene and is preferably hydrogenated to a final unsaturation above 50 percent of the original unsaturation. The B component is preferably poly(1,3-butadiene) and should be hydrogenated to an unsaturation that is less than 10 percent of the original unsaturation, preferably less than 5% of the original unsaturation.

The preferred acid compounds are unsaturated monocarboxylic and polycarboxylic-containing acids ($C_3$–$C_{10}$) with preferably at least one olefinic unsaturation, and anhydrides, salts, esters, ethers, and other substituted derivatives from said acids. Examples of such acids, anhydrides and derivatives thereof include maleic acid, fumaric acid, itaconic acid, citraconic acid, acrylic acid, acrylic polyethers, acrylic anhydride, methacrylic acid, crotonic acid, isocrotonic acid, mesaconic acid, angelic acid, maleic anhydride, itaconic anhydride, citraconic anhydride, sodium acrylate, calcium acrylate, and magnesium acrylate. The preferred monomers to be grafted to the block copolymers according to the present invention are maleic anhydride, maleic acid, fumaric acid and their derivatives.

Other monomers which can be used either in place of or in combination with one or more of the carboxylic acids or derivatives thereof include hydroxyl group containing compounds, preferably hydroxy $C_1$–$C_{20}$ alkyl acrylates or methacrylates such as 2-hydroxyethylacrylate, and epoxy group containing compounds such as glycidyl acrylate which also improve adhesion to metals and can be crosslinked as described below.

Of course, mixtures of monomers can be also added so as to achieve graft copolymers in which the graft chains contain at least two different monomers therein (in addition to the base polymer monomers).

The grafting reaction is initiated by a free radical initiator which is preferably an organic peroxygen compound. Special preferred peroxides are 2,5-dimethyl-2,5-di(t-butylperoxy)hexane (Lupersol 101), di-t-butylperoxide, 2,5-dimethyl-2,5-di-tert-butylperoxy-3-hexane (Lupersol 130), $\alpha,\alpha'$-bis(tert-butylperoxy)diisopropylbenzene (VulCup R), or any free radical initiator having a short half-life under the base polymer processing conditions. See pages 66–67 of *Modern Plastics,* Nov. 1971, which was incorporated by reference in the '429 patent and is incorporated by reference herein, for a more complete list of such compounds.

The grafted polymer may contain from 0.1 to 10, preferably 0.2 to 5 weight percent, of the grafted monomer to improve the adhesive property of the block copolymer. An amount of about 2%w maleic anhydride functional groups has worked well as shown in the Examples below.

Aminoplast Resin Crosslinker

For those applications in which the coating will undergo prolonged exposure to high temperatures or will be exposed to organic liquids such as gasoline, the coating should contain a crosslinking agent such as an aminoplast or a phenoplast resin, preferably an aminoplast resin. Aminoplast resins are generally formed by reaction of an amino compound with an aldehyde. Suitable amino compounds include urea derivatives, melamine derivatives and dicyandiamide derivatives. Melamine type amino compounds are particularly preferred for this invention. Suitable aldehydes include formaldehyde, acetaldehyde, acrolein or compounds which engender aldehydes such as paraldehyde and paraformaldehyde. Formaldehyde is the preferred aldehyde for this invention. Thus, methylated melamine—formaldehyde resins (such as CYMEL 303 produced by American Cyanamid) and butylated melamine—formaldehyde resins (such as CYMEL 1156) are particularly preferred. A strong acid catalyst is usually added along with the aminoplast resin to accelerate the crosslinking reaction. Examples of suitable catalysts are para-toluene sulfonic acid or various proprietary catalysts such as CYCAT 4040 or CYCAT 600 (from American Cyanamid). The amount of aminoplast resin used in the coating formulation is about 1 part to about 50 parts per hundred parts of acid functionalized hydrogenated block copolymer. The most preferred range is 10 parts to 25 parts. The amount of catalyst used is about 1 part to about 50 parts per hundred parts of aminoplast resin. The most preferred range is 5 parts to 25 parts.

Aminoplast resins work well for crosslinking monocarboxylic and dicarboxylic acid groups at temperatures above 175° C. as shown by the Examples below. Aminoplast resins are also expected to work at temperatures above 150° C. for hydroxyl groups. Crosslinking of epoxy group containing compounds is typically preformed with amines, acid compounds, or hydroxyl compounds at temperatures above 135° C. with crosslinking possible at room temperature for some amines.

Filler

Various types of fillers and pigments can be included in the coating formulation. This is especially true for exterior coatings in which fillers are added not only to create the desired appeal but also to improve the performance of the coating such as its weatherability. A wide variety of fillers can be used. Suitable fillers include calcium carbonate, clays, talcs, zinc oxide, titanium dioxide and the like. The amount of filler usually is in the range of 0 to about 65%w based on the solvent free portion of the coating, depending on the type of filler used and the application for which the coating is intended. An especially preferred filler is titanium dioxide.

Solvent

If the coating will be applied from solvent solution, the organic portion of the coating will be dissolved in a solvent or blend of solvents. Aromatic hydrocarbon solvents such as toluene, xylene, or Shell Cyclo Sol 53 are suitable. If desired, it is usually possible to obtain lower viscosity by using a solvent blend consisting of an aliphatic hydrocarbon solvent such as naphtha or mineral spirits or an aromatic hydrocarbon solvent with a polar solvent. Suitable polar solvents include esters such as isopropyl acetate, ketones such as methyl isobutyl ketone, and alcohols such as isopropyl alcohol. The amount of polar solvent used depends on the particular polar solvent chosen and on the level of acid functionality on the acid functionalized hydrogenated block copolymer. Usually, the amount of polar solvent used is between 0 and 50%w in the solvent blend.

Coating Process

The functionalized block copolymer coatings are usually applied to the metal as a solvent solution as described in U.S. Pat. No. 3,792,005 which is incorporated by reference herein. One such solvent useful in dissolving the preferred maleated S-EB-S block copolymer is a 90/10 blend by weight of toluene and isopropyl alcohol. The solution is prepared by dissolving the polymer and any other organic components such as the crosslinking agent and its catalyst, antioxidants and ultraviolet stabilizers in the solvent. This can be done with mild agitation but mixing with a high shear mixer will shorten mixing time. The solids content of this solution is usually between about 10%w and about 50%w depending on the molecular weight of the acid functionalized S-EB-S polymer, the formulation composition and the desired viscosity. A solids content of 25%w is frequently used. Once the organic components are dissolved, the filler, if present in the formulation, is added. High shear mixing is required to disperse the filler as is well known in coatings technology. The coating can be applied to the metal by any convenient means such as spraying or brushing or by means of a doctor blade or metering roll. The coating is usually applied to the metal at a dry coating thickness of between 0.1 mil and 1 mil depending on the intended application of the coated metal. Although the coating could be air dried at ambient temperature, it will usually be dried in a solvent evaporation oven at elevated temperature. If the coating contains an aminoplast crosslinker, crosslinking will normally be accomplished by heating the metal to high temperature, usually in the 200° to 275° C. range, in the solvent evaporation oven.

The following examples illustrate the preparation of metal coatings in accordance with the present invention and are not intended to limit the invention to the specific compounds and process steps that are described.

EXAMPLE 1 (Non-functionalized)

A commercially available, selectively hydrogenated block copolymer, Kraton ®G-1652 rubber (an S-EB-S block copolymer available from Shell Chemical Co.), was dissolved in a 90/10 percent by weight toluene/IPA solvent blend to give a final solution having 25 percent by weight of the copolymer. The 25 percent solution was cast onto tin plated steel. The coating was dried for 5 minutes at a temperature of about 120° C. resulting in a dry film thickness of about 0.19 mils.

A dried coated metal panel was emerged half in liquid water and half in water vapor within a pressure cooker for 90 minutes at a temperature of about 120° C. Upon removal from the pressure cooker, tackiness of the coating was qualitatively estimated by finger contact and discoloration or blush was estimated visually. Neither the water phase nor vapor phase portion of the sample was considered to be tacky and there was no discoloration visible on either portions. The mar resistance of the sample was then measured by scratching the coating with a fingernail. Both the water phase and vapor phase portion of the sample were marked, however, the coating remained in place. The adhesion of the coating was then determined by scratching an "x" on the coating and applying pressure sensitive tape which was peeled away to estimate adhesion loss. Adhesion loss was considered to be severe for this non-functionalized coating. Flexibility of the coating was estimated by bending a dried coated metal panel around a wedge mandrel and immersing the bent area in sulfuric acid. Any crack on the coating would result in the formation of rust. Since no rust formed in the bent area, the flexibility of the this coating was considered to be excellent.

The conditions and results for this sample are summarized in Table 1 which provides a comparison of the unfunctionalized block copolymer of Example 1 with the maleated block copolymer coatings of Examples 2–4.

EXAMPLE 2

The selectively hydrogenated block copolymer of Example 1 was melt reacted with maleic anhydride and 2,5-dimethyl-2,5-di(t-butylperoxy)hexane (Lupersol 101) in a twin screw extruder using the procedure disclosed in U.S. Pat. No. 4,578,429.

The resulting maleated polymer contained 2%w maleic anhydride grafted onto the S-EB-S polymer. In the presence of moisture the anhydride ring opens to give an acid functionalized block copolymer. A 25 percent solution of the functionalized block copolymer in the solvent blend of Example 1 was then prepared and cast onto a second sample of the tin plated steel. The coating was then dried for 5 minutes at a temperature of about 120° C. The dry coating film thickness was about 0.18 mil.

After drying, the sample was subjected to the same tests that were conducted on the sample of Example 1. Neither the water phase nor the vapor phase portion of the sample was estimated to be tacky and no discoloration was seen. Both portions of the sample were marked in the mar test. However, there was no notable adhesion loss of the coating in the adhesion test using the pressure sensitive adhesive tape. The flexibility of the sample was still found to be excellent. The conditions and results for this example are summarized in Table 1 for comparison with Example 1 and subsequent examples.

EXAMPLE 3

To 100 parts of the functionalized block copolymer of Example 2 were added 10 parts of Cymel 303 and 1 part of Cycat 600 which comprise a commercial melamine resin and catalyst for crosslinking the acid functionalized block copolymer. A 25 percent solution of the components was prepared in the solvent blend from Examples 1 and 2 and cast onto a third sample of the tin plated steel. The solution was allowed to cure for 5 minutes on the metal at a temperature of about 120° C. The dry coating film thickness was about 0.24 mils.

The sample was tested for tackiness, blush, mar resistance, adhesion loss and flexibility as determined for Examples 1 and 2. Neither the water nor the vapor phase portion of the sample was found to be tacky. Slight discoloration of the water phase portion was observed although there was no visible discoloration of the vapor phase portion. Some of the coating was removed from the water phase portion by the fingernail test although the vapor phase portion was only marked. The adhesion test removed a slight amount of the coating from the water phase portion and a moderate amount of coating from the vapor phase portion of the sample. The flexibility of the sample was again found to be excellent. The conditions and results are also summarized in Table 1.

EXAMPLE 4

The 25 percent coating solution of Example 3 was applied to a fourth sample of the metal and cured for 10 minutes at a temperature of about 205° C. The dry coating film thickness was about 0.19 mil.

This sample was also tested for tackiness, blush, mar resistance, adhesion loss, and flexibility using the same procedures as for Examples 1–3. Neither the water phase portion nor the vapor phase portion of this sample was found to be tacky or to have any discoloration. Both portions were marked in the fingernail test but no coating was removed. Furthermore, there was no observed adhesion loss by either the water phase or vapor phase portion of the sample. Flexibility of the sample was still excellent. The conditions and results of this example are also presented in Table 1.

EXAMPLE 5

The 25 percent solution of the functionalized block copolymer from Example 2 was cast upon aluminum panels to a dry thickness of about 5 mil. The film was dried at 40° C. and then heated at 177° C. for 20 minutes. The initial adhesion of the film to the aluminum panel was considered to be very good. Samples of the film were then immersed in gasoline (Shell regular unleaded) and toluene for further evaluation of the film appearance and adhesion but the coating merely dissolved off the metal. Results are reported in Table 2.

EXAMPLE 6

To 90 parts by weight of the functionalized block copolymer of Example 5 were added 9.1 parts of the Cymel 303 and 0.9 parts of the Cycat 600. A film was prepared from this formulation and tested for adhesion as described for Example 5. Results reported in Table 2 show that although the crosslinked film no longer dissolved when immersed in gasoline or toluene, these solvents caused the film to disbond from the aluminum.

EXAMPLE 7

To 80 parts of the functionalized block copolymer from Example 5 were added 18.2 parts of the Cymel 303 and 1.8 parts of the Cycat 600. Aluminum panels were coated with the formulation and tested for adhesion as described for Example 5. Results reported in Table 2 show that this level of aminoplast resin was sufficient to maintain adhesion of the crosslinked coating to aluminum even during immersion in gasoline or toluene.

EXAMPLE 8

To 65 parts by weight of the functionalized block copolymer used in Example 5 were added 31.9 parts of the Cymel 303 and 3.1 parts of the Cycat 600. The samples were prepared and tested for adhesion as described for Example 5. Results are presented in Table 2.

EXAMPLE 9

A solution containing 50 parts by weight of the functionalized block copolymer of Example 2 and 50 parts by weight of titanium dioxide (TI-PURE R-902 from DuPont) was prepared at 40%w solids in a 90/10 percent by weight toluene/isopropyl alcohol solvent blend. The coating cast on aluminum panels was dried, heated and tested as described for Example 5. Results in Table 2 show the coating had good initial adhesion to aluminum and suggest that it remained bonded during immersion in gasoline and toluene. However, when the panels were withdrawn from the gasoline and toluene and were dried, the coatings were crumbly and completely nonelastomeric. This shows that, since the formulation contained no aminoplast resin crosslinker, the functionalized block copolymer was largely extracted from the coating during immersion in gasoline and toluene, leaving predominantly titanium dioxide particles weakly adhered to the aluminum.

EXAMPLE 10

To 45 parts by weight of the functionalized block copolymer of Example 2 were added 4.55 parts of Cymel 303, 0.45 parts of Cycat 600, and 50 parts of the titanium dioxide. This formulation was dissolved as in Example 9 and was cast upon aluminum panels and tested for adhesion as described for Example 5. Results reported in Table 2 show that including the aminoplast resin crosslinker in the formulation crosslinks the functionalized block copolymer to maintain the coating as a coherent film during immersion in gasoline and toluene. It also helps to maintain adhesion of the coating to the aluminum during solvent immersion, especially in toluene.

TABLE 1

COMPARISON OF EXAMPLES 1–4 CONDITIONS AND RESULTS

| Example No. | 1 (Comparison) | 2 | 3 | 4 |
|---|---|---|---|---|
| Formulation % w | | | | |
| KRATON ® G 1652 | 100 | — | — | — |
| Functl S-EB-S | — | 100 | 90.1 | 90.1 |
| Cymel 303 | — | — | 9 | 9 |
| Cycat 600 | — | — | 0.9 | 0.9 |
| Cure: | | | | |
| Time, min. | 5 | 5 | 5 | 10 |
| Temp., °C. | 120 | 120 | 120 | 205 |
| Thickness, mil | 0.19 | 0.18 | 0.24 | 0.19 |
| Blush: | | | | |
| Water phase | None | None | Slight | None |
| Vapor phase | None | None | None | None |
| Mar Resistance: | | | | |
| Water phase | Fair | Fair | Poor | Fair |
| Vapor phase | Fair | Fair | Fair | Fair |
| Adhesion Loss: | | | | |
| Water phase | Severe | None | Slight | None |
| Vapor phase | Severe | None | Moderate | None |
| Flexibility | Excellent | Excellent | Excellent | Excellent |

TABLE 2

EFFECT OF CROSSLINKING ON FILM ADHESION AND SOLVENT RESISTANCE

| Example No. | 5 | 6 | 7 | 8 | 9 | 10 |
|---|---|---|---|---|---|---|
| Formulation[a], % w | | | | | | |
| Functl S-EB-S | 100 | 90 | 80 | 65 | 50 | 45 |
| Cymel 303 | — | 9.1 | 18.2 | 31.9 | — | 4.55 |
| Cycat 600 | — | 0.9 | 1.8 | 3.1 | — | 0.45 |

TABLE 2-continued

EFFECT OF CROSSLINKING ON FILM ADHESION AND SOLVENT RESISTANCE

| Example No. | 5 | 6 | 7 | 8 | 9 | 10 |
|---|---|---|---|---|---|---|
| Ti-Pure R-902 | — | — | — | 50 | 50 | |
| Initial Adhesion to Aluminum | Very good | Very good | Good | Fair[c] | Good | Good |
| After Gasoline Immersion[b] | | | | | | |
| Film Appearance | Dissolved | Coherent Soft | Coherent Soft | Coherent Waxy | —[d] | Coherent Soft |
| Adhesion | — | Disbonded | 100% Bonded | 100% Bonded | —[d] | Nearly Disbonded |
| After Toluene Immersion[b] | | | | | | |
| Film Appearance | Dissolved | Coherent Soft | Coherent Soft | Coherent Waxy | —[d] | Coherent Soft |
| Adhesion | — | Disbonded | 100% Bonded | 100% Bonded | —[d] | 100% Bonded |

[a]5 mil thick films cast on aluminum panels.
[b]Appearance of coating on aluminum after 1 week immersion at 24° C.
[c]The formulation was cloudy which may indicate sufficient concentration of the melamine resin to give phase separation.
[d]Functionalized S-EB-S block copolymer was dissolved out of the coating.
After the specimen was removed from the solvent and dried, only a powdery deposit was left on the aluminum.

What is claimed is:

1. A process for making a polymer coated metal article, comprising the steps of:

coating at least one surface of a metal by applying a solution consisting essentially of a solvent and a selectively hydrogenated and functionalized block copolymer having an $(A-B)_n-A$ configuration, wherein:

each A component of the block copolymer is predominately a polymerized vinyl aromatic hydrocarbon;

each B component of the block copolymer prior to hydrogenation is predominately a polymerized conjugated diene;

each A component is hydrogenated to an unsaturation that is above 50% of the original unsaturation;

each B component is hydrogenated to an unsaturation that is below 10% of the original unsaturation;

n is 1; and maleic anhydride is grafted to the block copolymer in an amount sufficient to improve adhesion of the block copolymer to the metal; and stamping the coated metal into a finished article.

2. The process of claim 1, wherein the A component is formed from styrene monomer and the B component is formed from either 1,3-butadiene monomer or isoprene monomer.

3. The process of claim 2, wherein the amount of the maleic anhydride is between about 0.2 and 5 percent by weight of the total weight of the block copolymer.

4. The process of claim 3, wherein the block copolymer is applied to the metal from a solution of the block copolymer in a blend of toluene and isopropylalcohol.

5. The process of claim 1, further comprising the step of crosslinking the functionalized block copolymer to improve resistance to organic solvents.

6. The process of claim 5, wherein the A component is formed from styrene monomer and the B component is formed from either 1,3-butadiene monomer or isoprene monomer.

7. The process of claim 6, wherein the amount of the maleic anhydride is between about 0.2 and 5 percent by weight of the block copolymer prior to the crosslinking step.

8. The process of claim 7, wherein the block copolymer is crosslinked with an aminoplast resin.

* * * * *